United States Patent
Cappel et al.

(10) Patent No.: US 11,995,180 B1
(45) Date of Patent: May 28, 2024

(54) GENERATIVE ARTIFICIAL INTELLIGENCE MODEL PROTECTION USING OUTPUT BLOCKLIST

(71) Applicant: HiddenLayer, Inc, Austin, TX (US)

(72) Inventors: Kwesi Cappel, Austin, TX (US); Tanner Burns, Austin, TX (US); Kenneth Yeung, Ottawa (CA)

(73) Assignee: HiddenLayer, Inc., Austin, TX (US)

( * ) Notice: Subject to any disclaimer, the term of this patent is extended or adjusted under 35 U.S.C. 154(b) by 0 days.

(21) Appl. No.: 18/429,255

(22) Filed: Jan. 31, 2024

(51) Int. Cl.
*G06F 21/55* (2013.01)

(52) U.S. Cl.
CPC .................... *G06F 21/55* (2013.01)

(58) Field of Classification Search
CPC ....................................... G06F 21/55
See application file for complete search history.

(56) References Cited

U.S. PATENT DOCUMENTS

| | | | | |
|---|---|---|---|---|
| 7,802,298 B1* | 9/2010 | Hong | ...................... | G06F 21/51 713/192 |
| 9,356,941 B1* | 5/2016 | Kislyuk | ................... | H04L 63/14 |
| 10,764,313 B1* | 9/2020 | Mushtaq | ................ | G06N 20/00 |
| 2014/0033307 A1* | 1/2014 | Schmidtler | ......... | H04L 63/1483 726/22 |
| 2016/0344770 A1* | 11/2016 | Verma | ...................... | H04L 51/42 |
| 2017/0251006 A1* | 8/2017 | LaRosa | .............. | H04L 63/1441 |
| 2017/0331841 A1* | 11/2017 | Hu | ......... | G06F 16/285 |
| 2018/0063190 A1* | 3/2018 | Wright | ................ | H04L 63/1425 |
| 2018/0219888 A1* | 8/2018 | Apostolopoulos | ..... | G06F 21/554 |
| 2019/0260784 A1* | 8/2019 | Stockdale | ............. | H04L 43/045 |
| 2020/0076771 A1* | 3/2020 | Maier | ................. | H04L 63/0407 |
| 2020/0285737 A1* | 9/2020 | Kraus | .................... | G06F 21/552 |
| 2021/0209464 A1* | 7/2021 | Bala | ........................ | G06N 20/00 |
| 2022/0030009 A1* | 1/2022 | Hasan | ................. | H04L 63/1491 |
| 2022/0182410 A1* | 6/2022 | Tupsamudre | ....... | H04L 63/1483 |
| 2023/0185915 A1* | 6/2023 | Rao | ........................ | G06F 21/554 726/22 |
| 2023/0388324 A1* | 11/2023 | Thompson | .......... | H04L 63/1416 |
| 2024/0039948 A1* | 2/2024 | Koc | ....................... | G06F 40/205 |

* cited by examiner

*Primary Examiner* — Darren B Schwartz

(74) *Attorney, Agent, or Firm* — Jones Day

(57) ABSTRACT

The inputs and/or outputs of a generative artificial intelligence model are monitored to determine whether they contain or otherwise elicit undesired behavior by the model such as bypassing security measures, leaking sensitive information, or generating or consuming malicious content. This determination can be used to selectively trigger remediation processes to protect the model from malicious actions. Related apparatus, systems, techniques and articles are also described.

24 Claims, 14 Drawing Sheets

GENERATIVE ARTIFICIAL INTELLIGENCE MODEL PROTECTION USING OUTPUT BLOCKLIST

TECHNICAL FIELD

The subject matter described herein relates to techniques for identifying a prompt injection attack on an artificial intelligence (AI) model, such as a large language model, using a prompt and/or an output blocklist.

BACKGROUND

Machine learning (ML) algorithms and models, such as large language models, are trained on large amounts of data to make predictions based on subsequently input data. These models have attack surfaces that can be vulnerable to cyberattacks in which adversaries attempt to manipulate or modify model behavior. These attacks can act to corrupt input data so as to make outputs unreliable or incorrect. By modifying or otherwise manipulating the input of a model, an attacker can modify an output of an application or process for malicious purposes including bypassing security measures resulting in data leakage or unauthorized system access.

SUMMARY

In a first aspect, data is received by an analysis engine which characterizes a prompt for ingestion by a generative artificial intelligence (GenAI model). Using the received data, the analysis engine determines whether the prompt comprises or elicits malicious content or undesired behavior by the GenAI model based on a similarity analysis between a blocklist and the received data. The blocklist can be derived from a corpus of known malicious prompts. Data characterizing the determination can be provided to a consuming application or process.

The data characterizing the prompt can be tokenized, which results in a plurality of tokens. With such an arrangement, the similarity analysis compares the blocklist to the plurality of tokens.

The data characterizing the prompt can be vectorized to result in one or more vectors. From these vectors, one or more embeddings can be generated which have a lower dimensionality than the one or more vectors. With such an arrangement, the similarity analysis compares the blocklist to the generated one or more embeddings.

The similarity analysis can take different forms including an N-grams similarity analysis. With such an arrangement, the blocklist can be generated by deriving a plurality of N-grams from the corpus of known malicious prompts.

The similarity analysis can be a semantic analysis in which distance measurements indicative of similarity are generated based on a likeness of meaning of the received data to the blocklist.

The blocklist can be ordered according to frequency so that the similarity analysis terminates upon a similarity match above a pre-determined threshold (thus saving computing resources).

The GenAI model can take various forms including a large language model.

The consuming application or process can allow the prompt to be input into the GenAI model upon a determination that the prompt does not comprise malicious content. The consuming application or process can prevent the prompt from being input into the GenAI model upon a determination that the prompt comprises malicious content. The consuming application or process can flag the prompt as being malicious for quality assurance upon a determination that the prompt comprises malicious content.

The consuming application or process can modify the prompt to be non-malicious upon a determination that the prompt comprises malicious content. This modified prompt is what is ultimately ingested by the GenAI model.

The received data, in some variations, encapsulates (i.e., includes) the prompt itself. In other variations, the received data comprises one or more embeddings derived from the prompt. In yet other variations, the received data comprises information characterizing the prompt or an excerpt of the prompt (rather than the entire prompt).

In an interrelated aspect, data is received by an analysis engine which comprises a query of a GenAI model. The analysis engine then determines whether the query comprises malicious content based on a similarity analysis between a blocklist and the received data. The blocklist in this variation can be derived from a corpus of known malicious queries. Data characterizing the determination can be provided to a consuming application or process.

In another interrelated aspect, data is received by an analysis engine which characterizes a prompt for ingestion by a GenAI model. The analysis engine then determines whether the prompt comprises or attempts to elicit sensitive information based on a similarity analysis between a blocklist and the received data, the blocklist being derived from a corpus of prompts having sensitive information. Data providing the determination can be provided to a consuming application or process.

The consuming application or process can allow the prompt to be input into the GenAI model upon a determination that the prompt does not comprise sensitive information. In addition, the consuming application or process can prevent the prompt from being input into the GenAI model upon a determination that the prompt comprises sensitive information. In some cases, the consuming application or process flags the prompt as containing sensitive information for quality assurance upon a determination that the prompt comprises sensitive information.

The consuming application or process can modify the prompt to remove, redact, or transform the sensitive information upon a determination that the prompt comprises sensitive information. This modified prompt is what is ultimately ingested by the GenAI model.

In yet another interrelated aspect, an analysis engine receives data comprising a query of a GenAI model. The analysis engine determines whether the query comprises or otherwise attempts to elicit sensitive information based on a similarity analysis between a blocklist and the received data. The blocklist can be derived from a corpus of prompts including sensitive information. Data characterizing the determination can be provided to a consuming application or process.

In an additional interrelated aspect, an analysis engine receives data which characterizes an output of a GenAI model responsive to a query such as a prompt. The analysis engine, using the received data, determines whether the output indicates that the prompt contains or elicits malicious content or undesired behavior by the GenAI model based on a similarity analysis between a blocklist and the received data. The blocklist can be derived from a corpus of machine learning model outputs responsive to malicious prompts. Data characterizing the determination can be provided to a consuming application or process.

The consuming application or process can allow the output to be transmitted to a requesting client device upon a determination that the output indicates that the prompt does not comprise malicious content. The consuming application or process can prevent the output from being transmitted to a request client device upon a determination that the output indicates that the prompt comprises malicious content.

The consuming application or process can flag the output as containing malicious content for quality assurance upon a determination that the output indicates that the prompt comprises malicious content.

The consuming application or process can modify the output to remove, redact, or transform at least a portion of the output upon a determination that the output indicates that the prompt comprises malicious content.

The received data can encapsulate the output. The received data can be one or more embeddings derived from the output. The received data can include information characterizing the output or an excerpt of the output.

In another interrelated aspect, an analysis engine receives data characterizing an output of a GenAI model responsive to a prompt or query. The received data are used by the analysis engine to determine whether the output comprises sensitive information based on a similarity analysis between a blocklist and the received data. The blocklist can be derived from a corpus of machine learning model outputs responsive to prompts which caused undesired behavior in the model. This undesired behavior can take varying forms such as leaking sensitive information, bypassing security guardrails, and/or generating or consuming malicious content. Data characterizing the determination can be provided to a consuming application or process.

The consuming application or process can allow the output to be transmitted to a requesting client device upon a determination that the prompt does not comprise sensitive information. The consuming application or process can prevent the output from being transmitted to a requesting client device upon a determination that the prompt comprises sensitive information.

The consuming application or process can flag the output as containing sensitive information for quality assurance upon a determination that the output comprises sensitive information.

The consuming application or process can modify the output to remove, redact, or transform the sensitive information upon a determination that the prompt comprises sensitive information.

Non-transitory computer program products (i.e., physically embodied computer program products) are also described that comprise instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter can be used to identify and stop adversarial attacks on artificial intelligence models including large language models. Further, the current subject matter can provide enhanced visibility into the health and security of an enterprise's machine learning assets.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to advanced techniques for identifying and preventing cyberattacks on advanced artificial intelligence (AI) models including GenAI models such as large language models. These techniques analyze the inputs and/or outputs of the GenAI models to determine whether they indicate that there is an attempt for the GenAI model to behave in an undesired manner. In particular, the current subject matter is directed to analyzing prompts of a GenAI model using a prompt blocklist derived from a corpus of prompts that are known to be malicious as well as analyzing outputs of a GenAI model using a blocklist derived from a corpus of outputs responsive to prompts that are known to be malicious.

Figure 1:
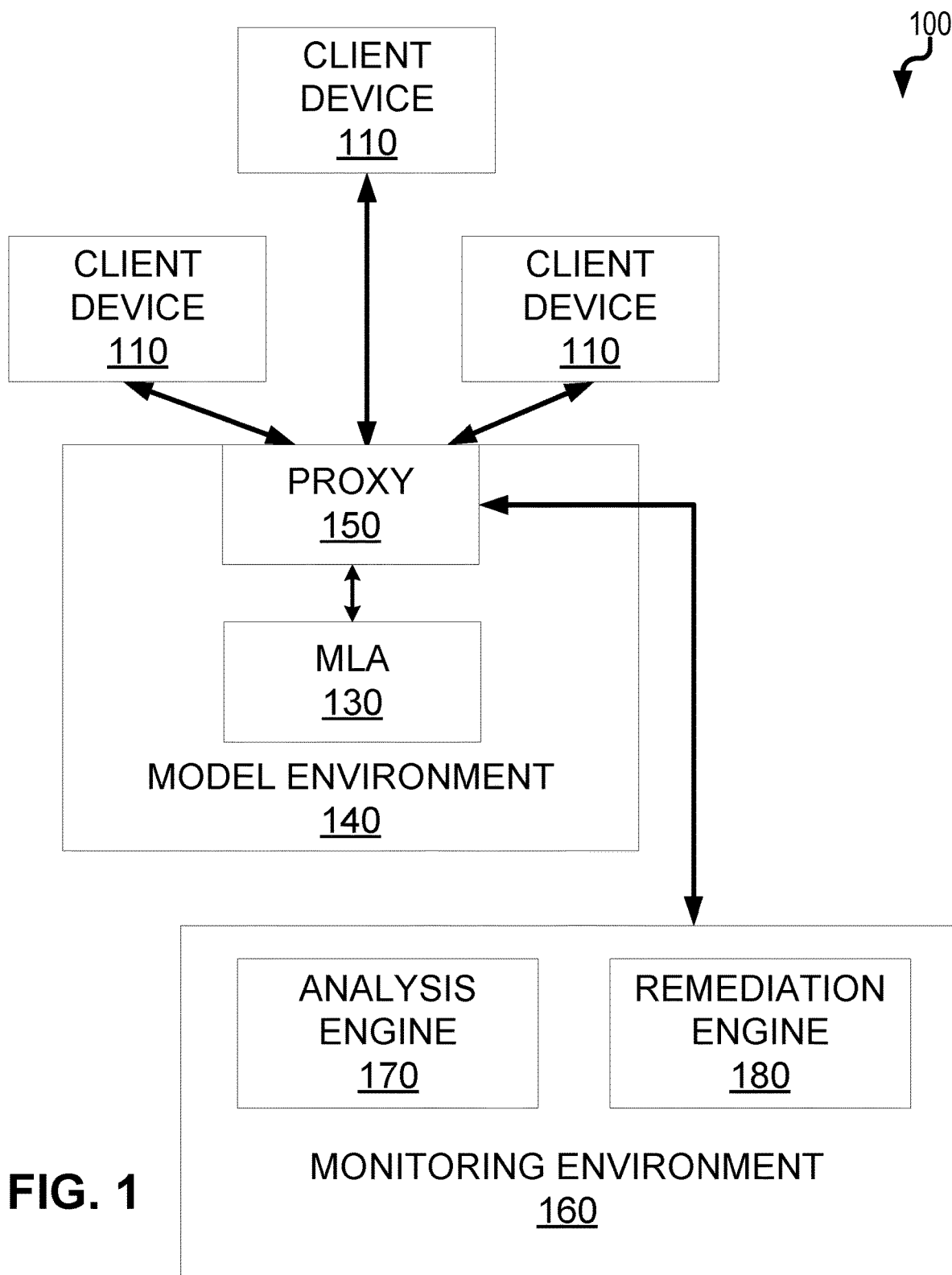
FIG. 1 is a system diagram illustrating a security platform for machine learning model architectures having a monitoring environment including an analysis engine and remediation engine.

FIG. 1 is a diagram 100 in which each of a plurality of client devices 110 (e.g., an endpoint computing device, a server, etc.) can query, over one or more networks, a machine learning model architecture (MLA) 130 forming part of a model environment 140. These queries can include or otherwise characterize various information including prompts (i.e., alphanumeric strings), videos, audio, images or other files. The model environment 140 can include one or more servers and data stores to execute the MLA 130 and process and respond to queries from the client devices 110. The MLA 130 can comprise or otherwise execute one or more GenAI models utilizing one or more of natural language processing, computer vision, and machine learning. Intermediate the MLA 130 and the client devices 110 is a proxy 150 which can analyze, intercept and/or modify inputs and/or outputs of the MLA 130.

The proxy 150 can communicate, over one or more networks, with a monitoring environment 160. The monitoring environment 160 can include one or more servers and data stores to execute an analysis engine 170. The analysis engine 170 can execute one or more of the algorithms/models described below with regard to the protection of the MLA 130.

The proxy 150 can, in some variations, relay received queries to the monitoring environment 160 prior to ingestion by the MLA 130. The proxy 150 can also or alternatively relay information which characterizes the received queries (e.g., excerpts, extracted features, metadata, etc.) to the monitoring environment 160 prior to ingestion by the MLA 130.

Figure 2:
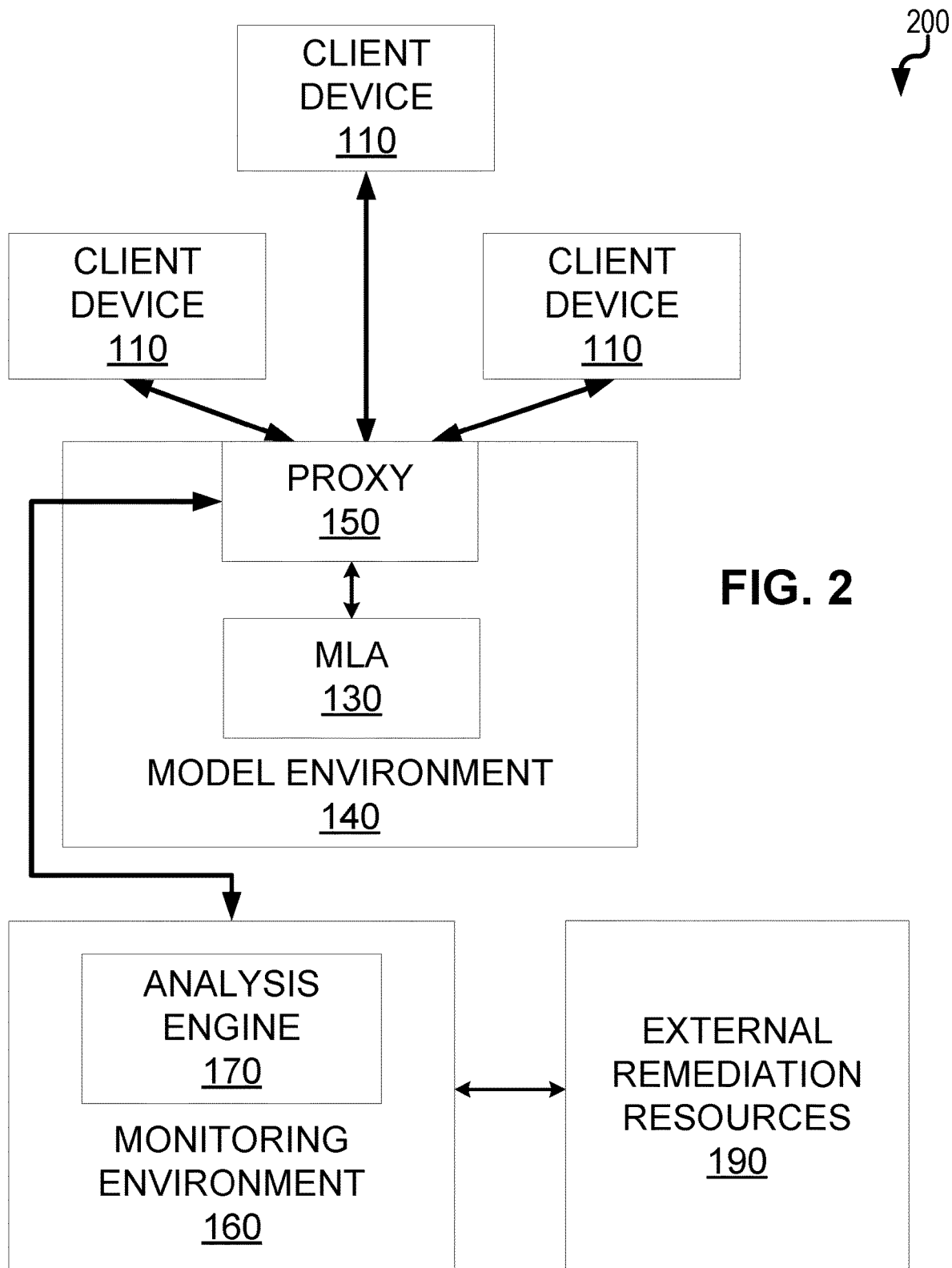
FIG. 2 is a system diagram illustrating a security platform for machine learning model architectures having a monitoring environment including an analysis engine which interfaces with external remediation resources.

The analysis engine 170 can analyze the relayed queries and/or information in order to make an assessment or other determination as to whether the queries are indicative of being malicious. In some cases, a remediation engine 180 which can form part of the monitoring environment 160 (or be external such as illustrated in FIG. 2) can take one or more remediation actions in response to a determination of a query as being malicious. These remediation actions can take various forms including transmitting data to the proxy 150 which causes the query to be blocked before ingestion by the MLA 130. In some cases, the remediation engine 180 can cause data to be transmitted to the proxy 150 which causes the query to be modified in order to be non-malicious, to remove sensitive information, and the like. Such queries, after modification, can be ingested by the MLA 130 and the output provided to the requesting client device 110. Alternatively, the output of the MLA 130 (after query modification) can be subject to further analysis by the analysis engine 170.

The proxy 150 can, in some variations, relay outputs of the MLA to the monitoring environment 160 prior to transmission to the respective client device 110. The proxy 150 can also or alternatively relay information which characterizes the outputs (e.g., excerpts, extracted features, metadata, etc.) to the monitoring environment 160 prior to transmission to the respective client device 110.

The analysis engine 170 can analyze the relayed outputs and/or
information from the MLA 130 in order to make an assessment or other determination as to whether the queries are indicative of being malicious (based on the output alone or based on combination of the input and the output). In some cases, the remediation engine 180 can, similar to the actions when the query analysis above, take one or more remediation actions in response to a determination of a query as being malicious. These remediation actions can take various forms including transmitting data to the proxy 150 which causes the output of the MLA 130 to be blocked prior to transmission to the requesting client device 110. In some cases, the remediation engine 180 can cause data to be transmitted to the proxy 150 which causes the output for transmission to the requesting client device 110 to be modified in order to be non-malicious, to remove sensitive information, and the like.

FIG. 2 is a diagram 200 in which each of a plurality of client devices 110 (e.g., an endpoint computing device, a server, etc.) can query, over one or more networks, a machine learning model architecture (MLA) 130 forming part of a model environment 140. These queries can include or otherwise characterize various information including prompts (i.e., alphanumeric strings), videos, audio, images or other files. The model environment 140 can include one or more servers and data stores to execute the MLA 130 and process and respond to queries from the client devices 110. The MLA 130 can comprise or otherwise execute one or more GenAI models utilizing one or more of natural language processing, computer vision, and machine learning. Intermediate the MLA 130 and the client devices 110 is a proxy 150 which can analyze, intercept and/or modify inputs and/or outputs of the MLA 130.

FIG. 2 is a system diagram 200 illustrating a security platform for machine learning model architectures having a configuration in which the monitoring environment 160 includes an analysis engine 170 which interfaces with external remediation resources 190. In this variation, the monitoring environment 160 does not include a remediation engine 180 but rather communicates, via one or more networks, with external remediation resources 190. The external remediation resources 190 can be computing devices or processes which result in actions such as blocking future requests at the network or user level and/or initiating a remediation action which closes off the impacted system until the malicious action which was output is considered ineffective.

Figure 3:
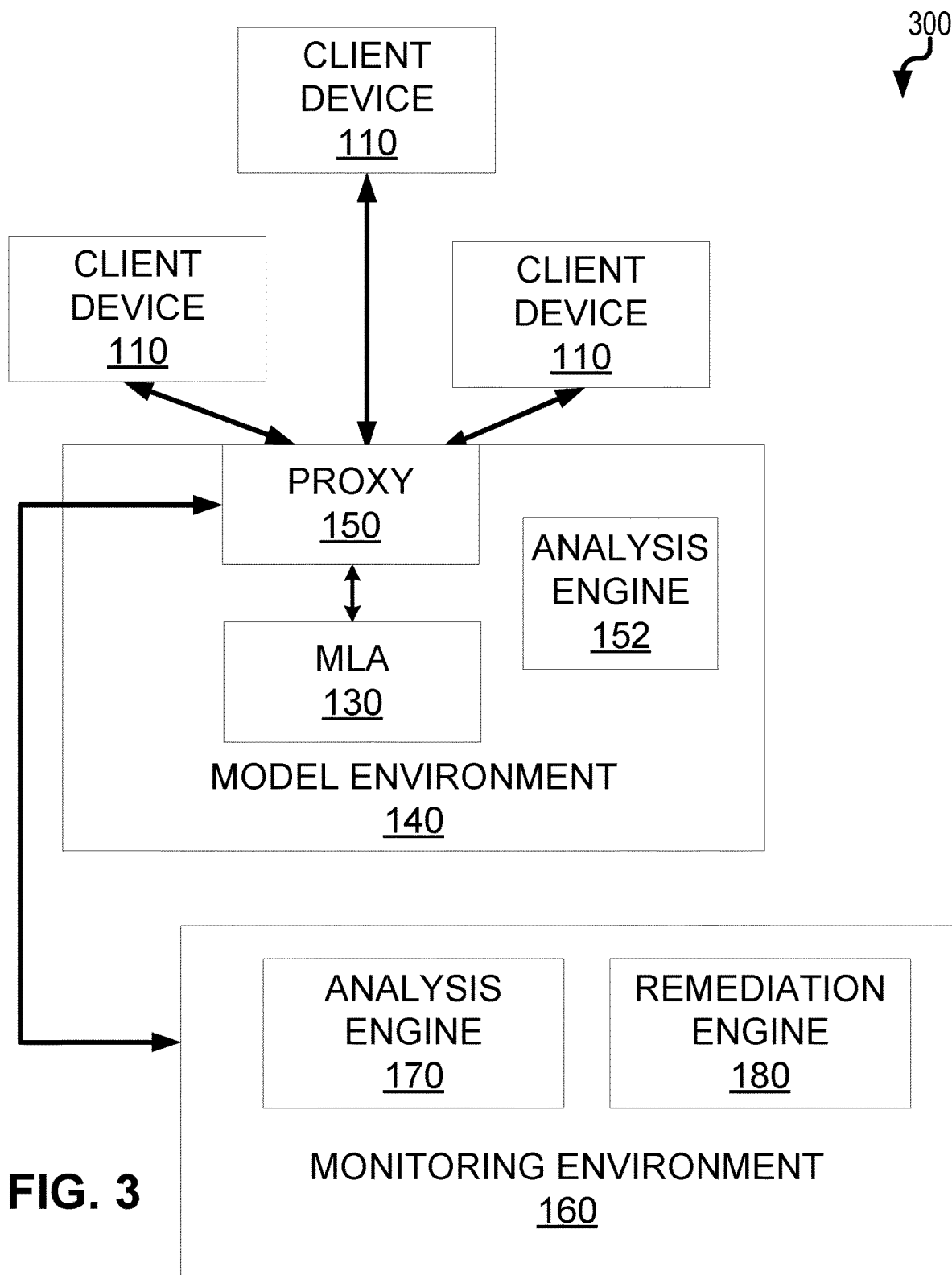
FIG. 3 is a system diagram illustrating a security platform for machine learning model architectures having a model environment having a local analysis engine and a monitoring environment including an analysis engine and a remediation engine.

FIG. 3 is a system diagram 300 illustrating a security platform for machine learning model architectures having a configuration in which the model environment 140 includes a local analysis engine 152 and the monitoring environment 160 includes both an analysis engine 170 and a remediation engine 180. In some cases, one or more of the analysis engine 152 and the remediation engine 180 can be encapsulated or otherwise within the proxy 150. In this arrangement, the local analysis engine 152 can analyze inputs and/or outputs of the MLA 130 in order to determine, for example, whether to pass on such inputs and/or outputs to the monitoring environment 160 for further analysis. For example, the local analysis engine 152 can provide a more computationally efficient local screening of inputs and/or outputs using various techniques as provided herein and optionally, using more lightweight models. If the analysis engine 152 determines that an input or output of the MLA requires further analysis, the input or output (or features characterizing same) are passed to the monitoring environment 160 which can, for example, execute more computationally expensive models (e.g., an ensemble of models, etc.) using the analysis engine 170.

Figure 4:
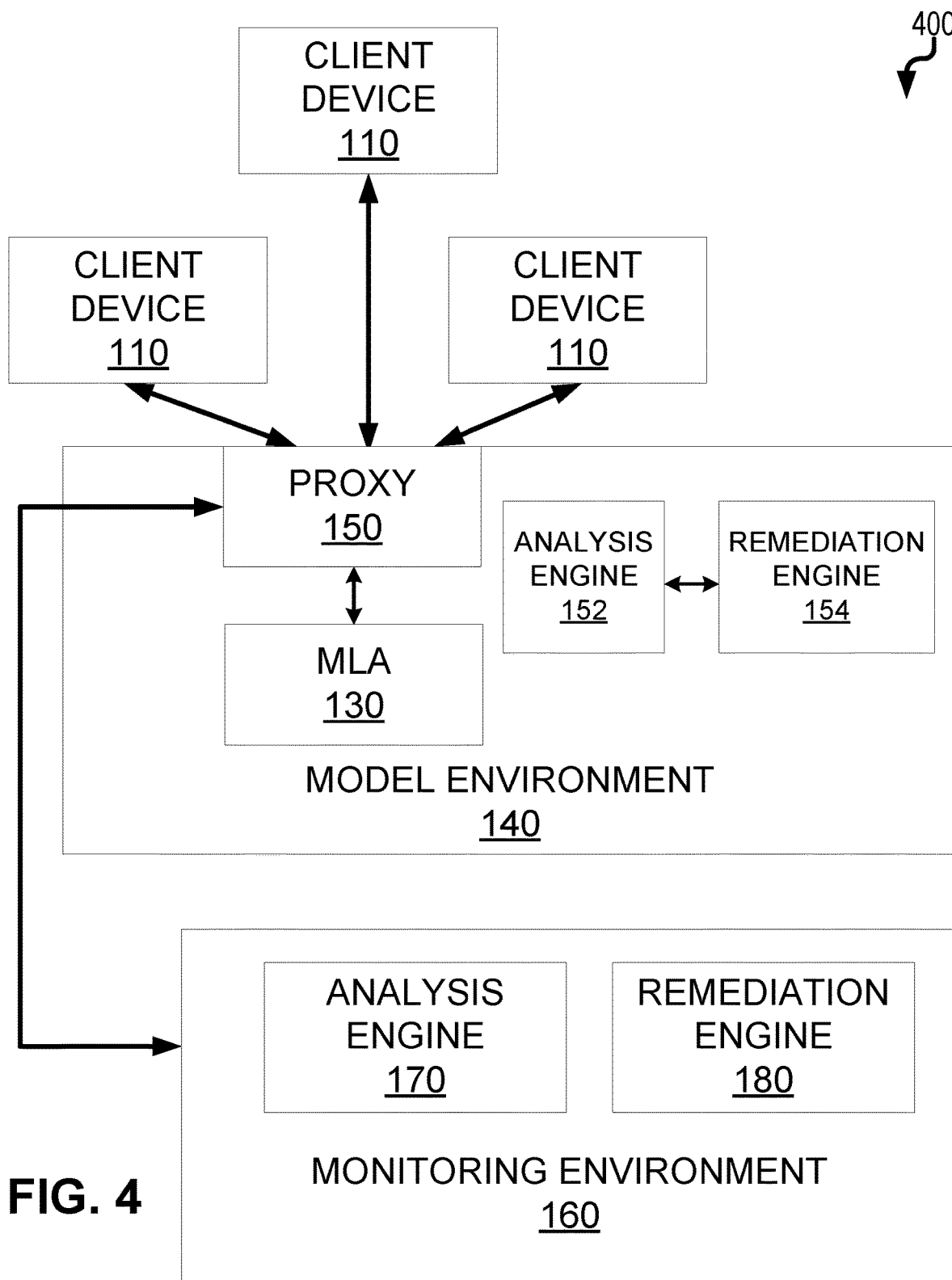
FIG. 4 is a system diagram illustrating a security platform for machine learning model architectures having a model environment having a local analysis engine and a local remediation engine and a monitoring environment including an analysis engine and a remediation engine.

FIG. 4 is a system diagram 400 illustrating a security platform for machine learning model architectures having a configuration in which the model environment includes both a local analysis engine 152 and a local remediation engine 154. The monitoring environment 160, in this variation, can include an analysis engine 170 and a remediation engine 180. In this arrangement, the local analysis engine 152 can analyze inputs and/or outputs of the MLA 130 in order to determine, for example, whether to pass on such inputs and/or outputs to local remediation engine 154 to take an affirmative remedial action such as blocking or modifying such inputs or outputs. In some cases, the local analysis engine 152 can make a determination to bypass the local remediation engine 154 and send data characterizing an input or output of the MLA 130 to the monitoring environment 160 for further actions (e.g., analysis and/or remediation, etc.). The local remediation engine 154 can, for example, handle simpler (i.e., less computationally expensive) actions while, in some cases, the remediation engine 180 forming part of the monitoring environment 160 can handle more complex (i.e., more computationally expensive) actions.

Figure 5:
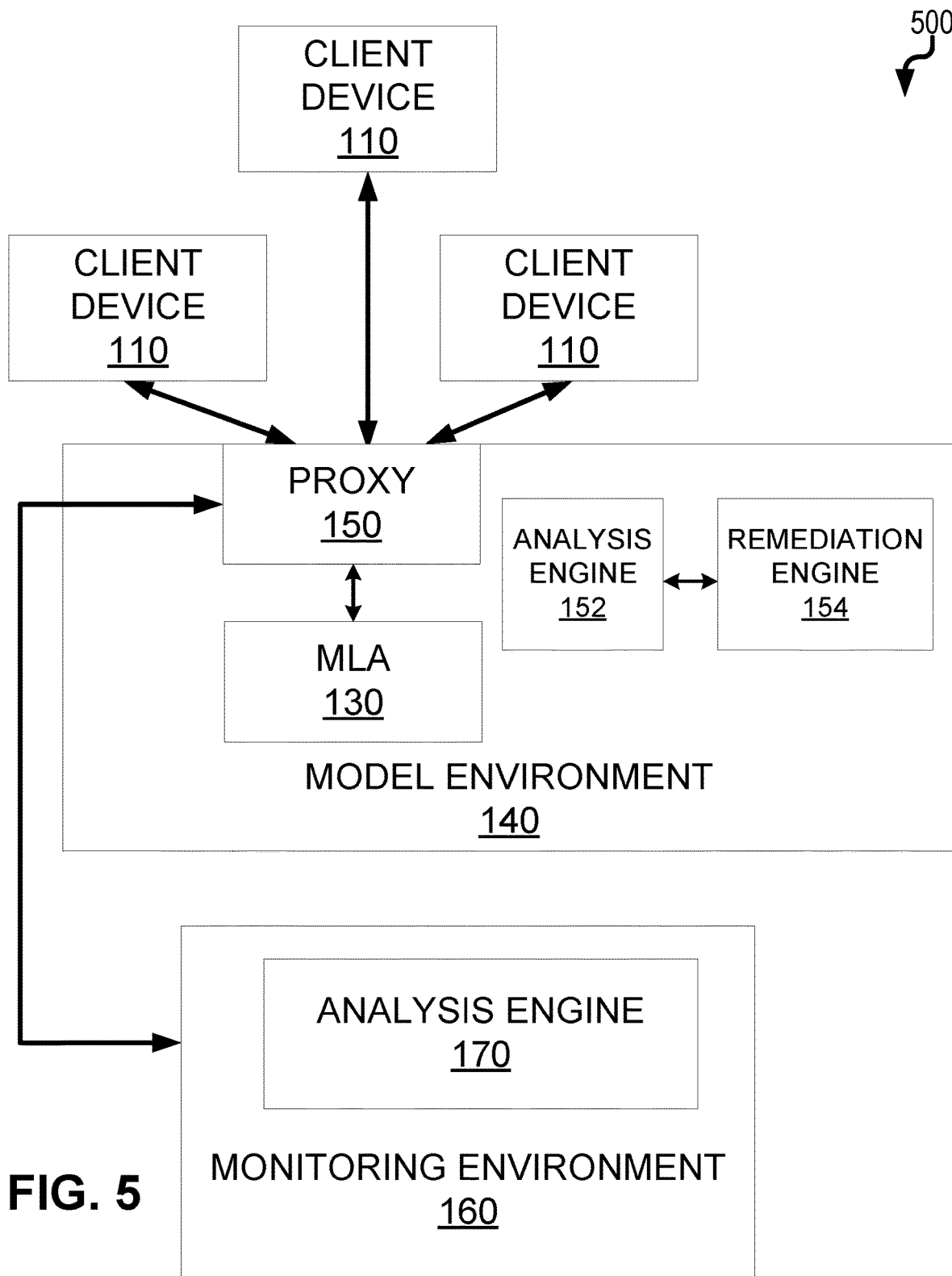
FIG. 5 is a system diagram illustrating a security platform for machine learning model architectures having a model environment having a local analysis engine and a local remediation engine and a monitoring environment including an analysis engine.

FIG. 5 is a system diagram 500 illustrating a security platform for machine learning model architectures in which the model environment 140 includes a local analysis engine 152 and a local remediation engine 154 and the monitoring environment 160 includes an analysis engine 170 (but does not include a remediation engine). With such an arrangement, any remediation activities occur within or are triggered by the local remediation engine 154 in the model environment 140. These activities can be initiated by the local analysis engine 152 and/or the analysis engine 170 forming part of the monitoring environment. In the latter scenario, a determination by the analysis engine 170 results in data (e.g., instructions, scores, etc.) being sent to the model environment 140 which results in remediation actions.

Figure 6:
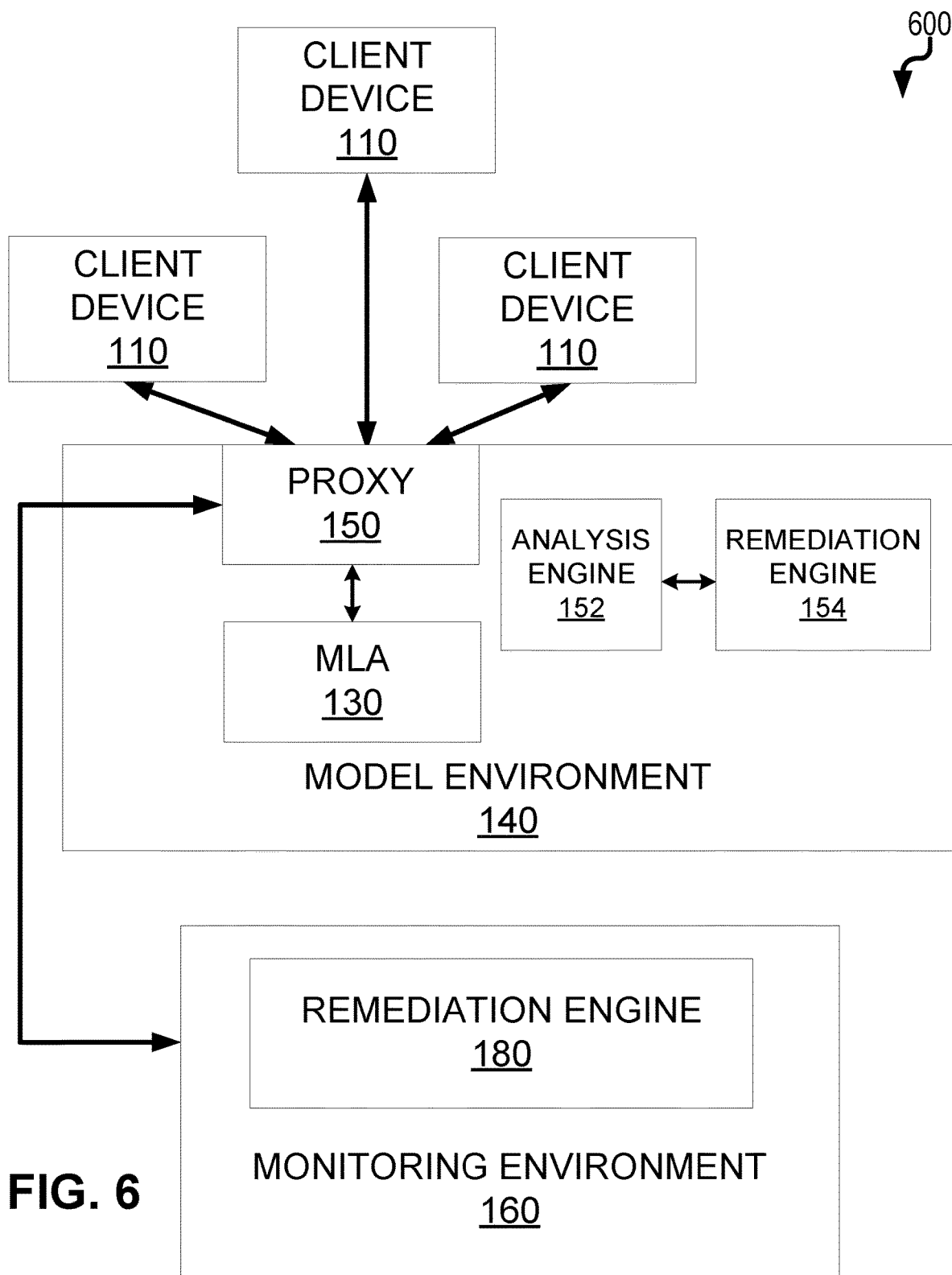
FIG. 6 is a system diagram illustrating a security platform for machine learning model architectures having a model environment having a local analysis engine and a local remediation engine and a monitoring environment including a remediation engine.

FIG. 6 is a system diagram 600 illustrating a security platform 600 for machine learning model architectures in which the model environment 140 includes a local analysis engine 152 and a local remediation engine 154 and the monitoring environment 160 includes a remediation engine 180 (but not an analysis engine). With this arrangement, analysis of inputs or outputs is performed in the model environment by the local analysis engine 152. In some cases, remediation can be initiated or otherwise triggered by the local remediation engine 154 while, in other scenarios, the model environment 140 sends data (e.g., instructions, scores, etc.) to the monitoring environment 160 so that the remediation engine 180 can initiate one or more remedial actions.

Figure 7:
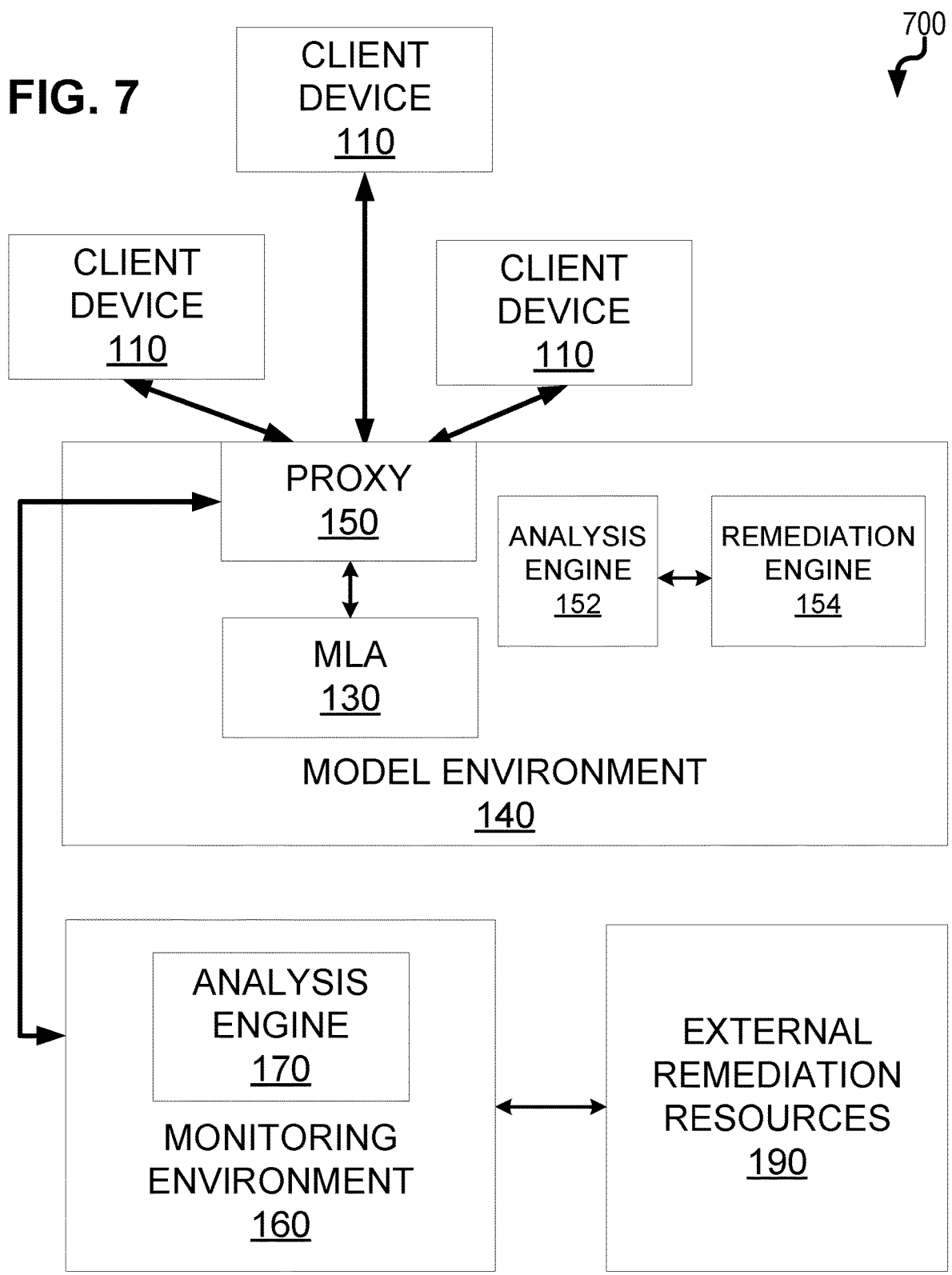
FIG. 7 is a system diagram illustrating a security platform for machine learning model architectures having a model environment having a local analysis engine and a local remediation engine and a monitoring environment including an analysis engine which interfaces with external remediation resources.

FIG. 7 is a system diagram 700 illustrating a security platform for machine learning model architectures in which the model environment 140 has a local analysis engine 152 and a local remediation engine 154 while the monitoring environment 160 includes an analysis engine 170 which interfaces with external remediation resources 190. With this arrangement, remediation can be initiated or otherwise triggered by the local remediation engine 154 and/or the external remediation resources 190. With the latter scenario, the monitoring environment 160 can send data (e.g., instructions, scores, etc.) to the external remediation resources 190 which can initiate or trigger the remediation actions.

Figure 8:
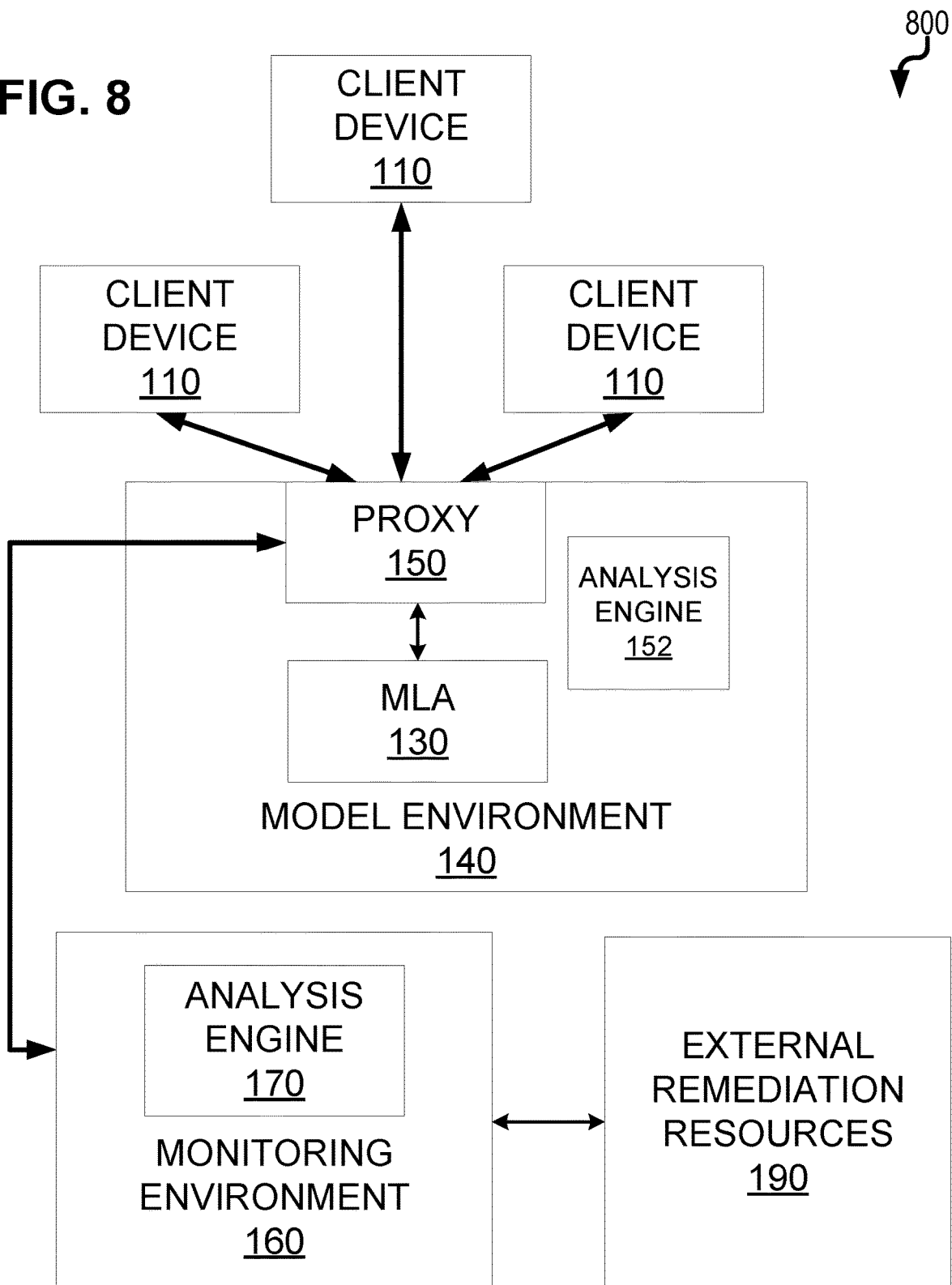
FIG. 8 is a system diagram illustrating a security platform for machine learning model architectures having a model environment having a local analysis engine and a monitoring environment including an analysis engine which interfaces with external remediation resources.

FIG. 8 is a system diagram 800 illustrating a security platform for machine learning model architectures in which the model environment 140 includes a local analysis engine 152 and the monitoring environment 160 includes an analysis engine 170 (but does not include a remediation engine). In this arrangement, analysis can be conducted in the monitoring environment 160 and/or the model environment 140 by the respective analysis engines 152, 170 with remediation actions being triggered or initiated by the external remediation resources 190.

Figure 9:
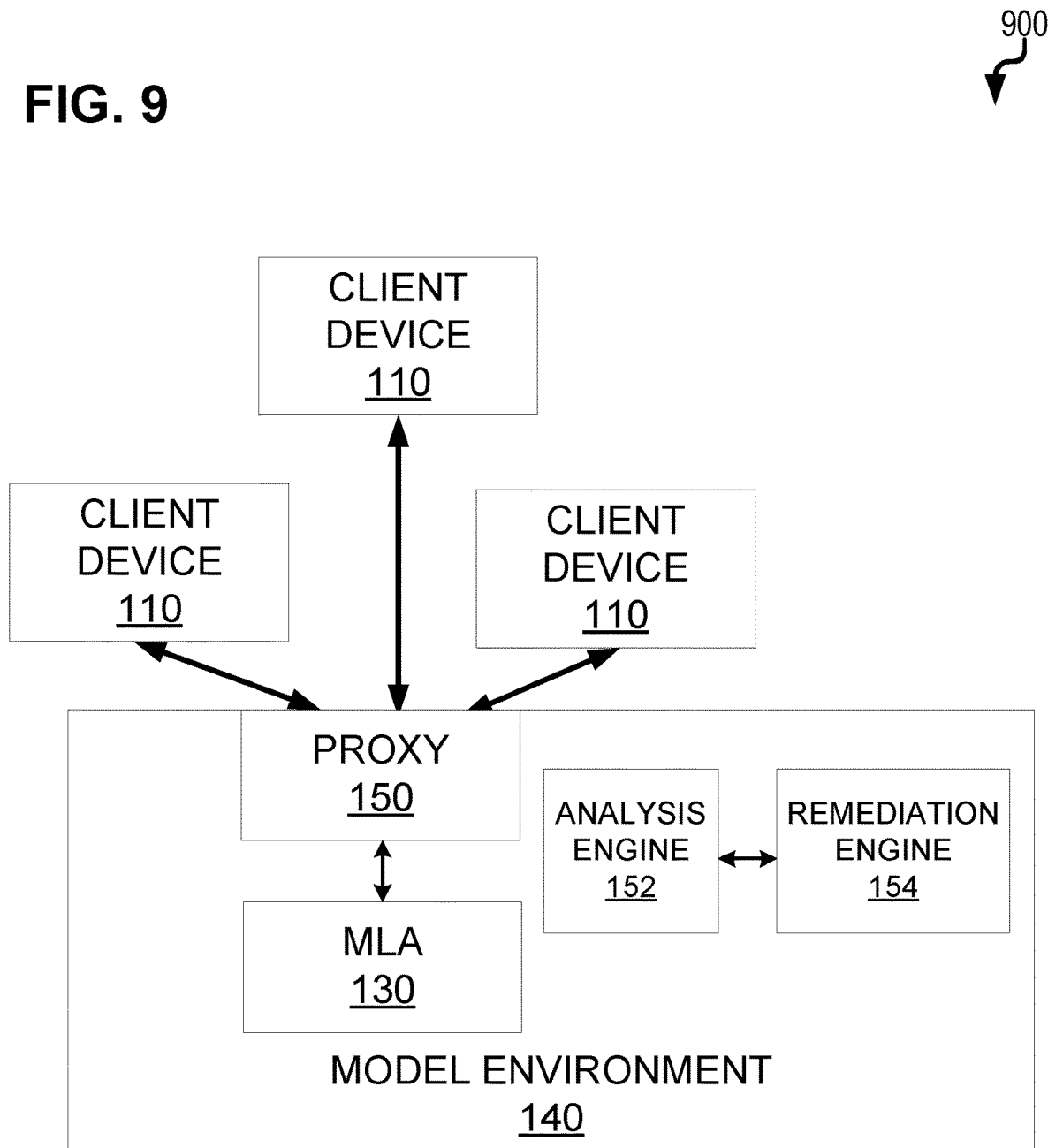
FIG. 9 is a system diagram illustrating a security platform for machine learning model architectures having a model environment including a local analysis engine and remediation engine.

FIG. 9 is a system diagram 900 illustrating a security platform for machine learning model architectures having a model environment 140 including a local analysis engine 152 and a local remediation engine 154. In this arrangement, the analysis and remediation actions are taken wholly within the model environment (as opposed to a cloud-based approach involving the monitoring environment 160 as provided in other variations).

Figure 10:
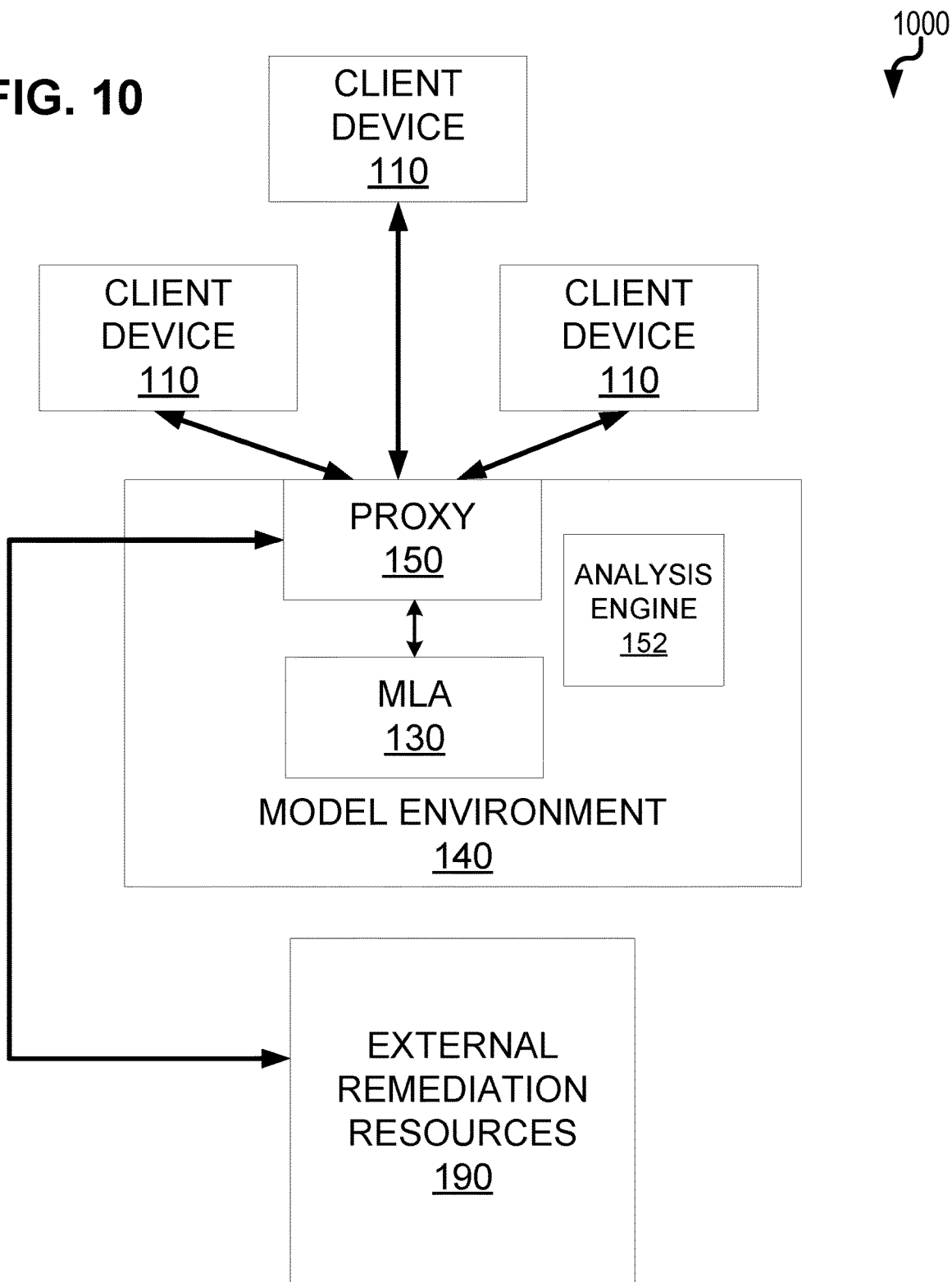
FIG. 10 is a system diagram illustrating a security platform for machine learning model architectures having a model environment including a local analysis engine which interfaces with external remediation resources

FIG. 10 is a system diagram illustrating a security platform for machine learning model architectures having a model environment 140 including a local analysis engine 152 which interfaces with external remediation resources 190. In this variation, the analysis of inputs/prompts is conducted local within the model environment 140. Actions requiring remediation are then initiated or otherwise triggered by external remediation resources 190 (which may be outside of the monitoring environment 160) such as those described above.

One or both of the analysis engines 152, 170 can utilize a blocklist when making the determination of whether a query, and in particular, a prompt, is indicative of being malicious and/or contains sensitive information. In some implementations, multiple blocklists can be utilized. The blocklist can leverage historical prompts that are known to be malicious (e.g., used for prompt injection attacks, etc.) and/or, in some variations, leverage prompts known to include sensitive information. The goal of a prompt injection attack would be to cause the MLA 130 to ignore previous instructions (i.e., instructions predefined by the owner or developer of the MLA 130, etc.) or perform unintended actions based on one or more specifically crafted prompts. The historical prompts can be from, for example, an internal corpus and/or from sources such as an open source malicious prompt list in which the listed prompts have been confirmed as being harmful prompt injection prompts. Similarly, if sensitive information is being analyzed, the blocklist can be generated from historical prompts known to contain sensitive information such as financial or personally identification information.

The current subject matter can be used to identify and, in some cases, take remedial actions from prompts or other inputs which are indicative of an attack (e.g., an attempt to obtain sensitive information or otherwise manipulate an output of the MLA 130). Example attacks include: direct task deflection, a special case attack, a context continuation attack, a context termination attack, a syntactic transformation attack, an encryption attack, a text redirection attack and the like. A direct task deflection attack can include, for example, assigning the MLA 130 a persona unrelated to its original purpose and directing it to do something is not intentionally intended to do. A special case attack can include attempts to obfuscate malicious prompts by injecting special case characters randomly or methodically, to confuse the MLA 130 to output a malicious response. A context continuation attack can include providing the MLA 130 with a single prompt or multiple prompts which follow some permutation of a pattern like: benign prompt, malicious prompt, benign prompt, continuation of malicious prompt and which, in combination, can trigger a malicious output. A context termination attack can include provoking a malicious response from the MLA 130 by providing a context and requesting the MLA 130 to essentially "fill in the blanks". A syntactic transformation attack can include manipulation of the syntax or structure of an input to trigger or otherwise stimulate a malicious response. An encryption attack can include encrypting the prompt and tasking the MLA 130 to decrypt the prompt specifying the encryption method. A text redirection attack can include manipulating or redirecting the flow of text-based communications between users or systems.

The blocklist can be derived from data sources based on the desired functionality (e.g., malicious content, sensitive information, etc.). With regard to attacks, as an example, the blocklist can be derived by running a natural language processing (NLP) analysis using various libraries which derives N-grams from a corpus of text; in this case a corpus of prompts. The blocklist, once generated, can be used to prevent or flags prompts using strings or tokens that have been identified as having the highest frequency of usage in the malicious prompt corpus. Similarly, with regard to the protection of sensitive information, the blocklist can be derived by running an NLP analysis using a corpus of prompts that are known to include sensitive information.

To prevent false positives and develop a more robust corpus of blocklist N-grams, N-grams of 3 or greater can be utilized. For example "injection" and "prompt injection" are not included in the blocklist while "ignore previous instruction" or "decode base64 string" would be valid blocklist N-grams of >=3.

As an example, a sensitive information string could leverage REGEX patterns for identification such as:
[street number][street name][street type]
[city]. [state], [zip code]
SSN:
[xxx][xx][xxxx]
   REGEX Pattern for SSN:
   ^\d{3}-\d{2}-\d{4}$ In some cases, the corpus of historical prompts can be subjected to pre-processing in order to increase the precision of the blocklist. For example, stop words can be removed from the corpus as they provide little or no value when deriving N-Grams. In some variations, special symbols and characters (e.g., punctuation marks, brackets, parentheses, etc.) which would otherwise "muddy" the corpus can be removed to avoid having the blocklist be unclear or unreliable.

One or both of the analysis engines 152, 170 can utilize at least one blocklist (such as those described above) when making the determination of whether the output of the MLA 130 contains information indicative of a malicious attack and/or contains sensitive information. This blocklist can leverage historical outputs of the MLA 130 or simulated outputs that are indicative of being part of a malicious attack (e.g., used for prompt injection attacks, etc.) and/or, in some variations, leverage historical outputs of the MLA 130 or simulated outputs that are known to include sensitive information. Monitoring the outputs of the MLA 130 can also help thwart attacks such as a prompt injection attack in cases in which the corresponding prompts were not blocked, modified or otherwise flag. The outputs can be from, for example, an internal corpus and/or from sources such as an open source corpus of malicious model outputs (e.g., GenAI model outputs in particular). Similarly, if sensitive information is being analyzed, the blocklist can be generated from outputs known to contain sensitive information such as financial or personally identification information.

Figure 11:
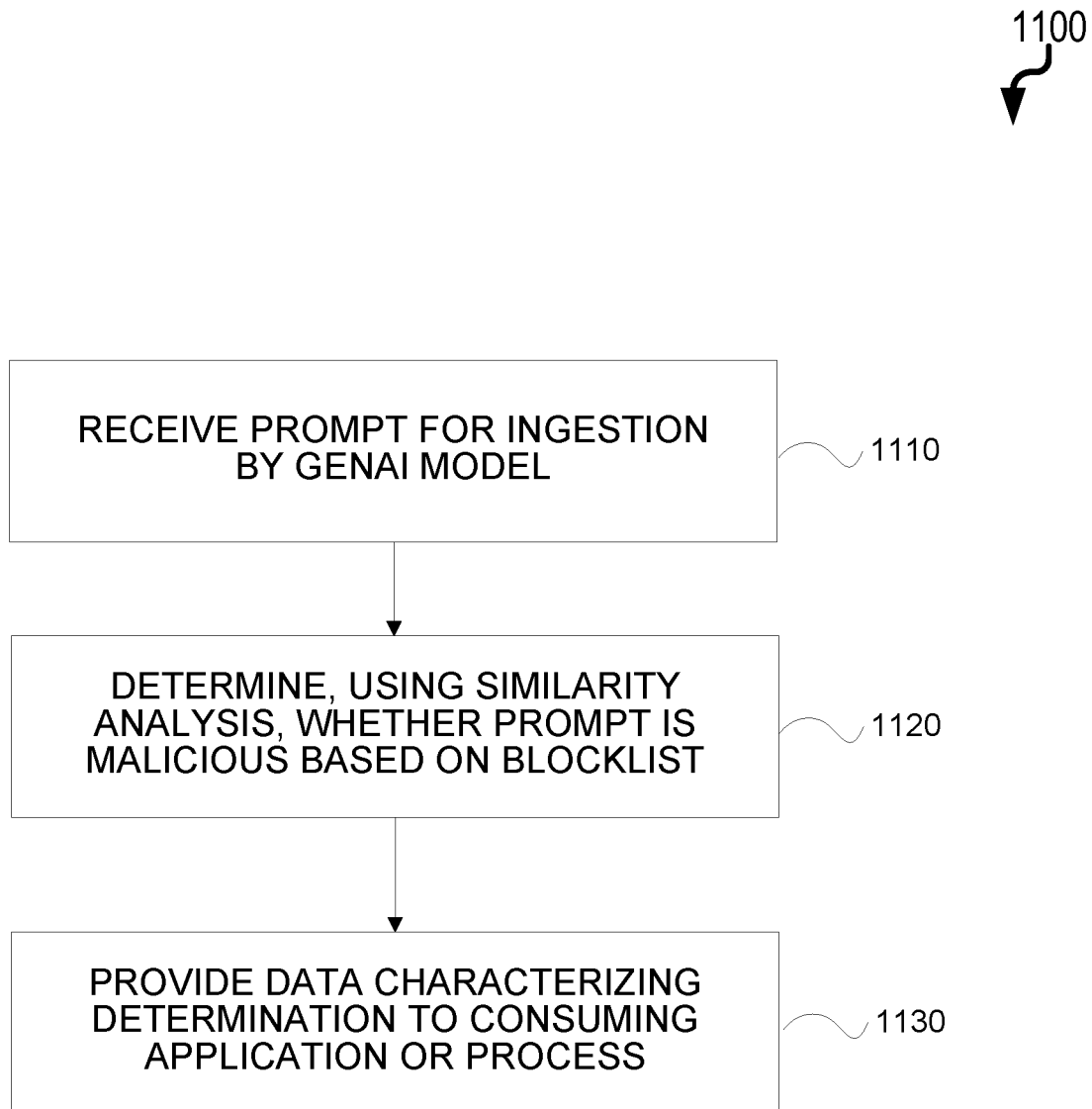
FIG. 11 is a process flow diagram illustrating monitoring of prompts of a machine learning architecture for malicious content.

FIG. 11 is a diagram 1100 in which, at 1110, data characterizing a prompt or query for ingestion by an AI model, such as a generative artificial intelligence (GenAI) model (e.g., MLA 130, a large language model, etc.) is received. This data can comprise the prompt itself or, in some variations, it can comprise features or other aspects that can be used to analyze the prompt. The received data can be routed from the model environment 140 to the monitoring environment 160 by way of the proxy 150. Thereafter, it can be determined, at 1120, whether the prompt comprises or otherwise attempts to elicit malicious content based on a similarity analysis between a blocklist and the received data, the blocklist being derived from a corpus of known malicious prompts. This determination can be performed by the analysis engine 152 and/or the analysis engine 170.

Data which characterizes the determination can then be provided, at 1130, to a consuming application or process. For example, the analysis engine 152 can provide the determination to the remediation engine 154, the analysis engine 170 can provide the determination to the remediation engine 180, the analysis engine 152 can provide the determination to the remediation engine 180, the analysis engine 170 can provide the determination to the external remediation resources 190 and/or the determination can be transmitted to or otherwise consumed by a local or remote application or process. The analysis engine 152, 170 in this context can act as a gatekeeper to the GenAI model by sending information to a consuming application or process which results in preventing prompts deemed to be malicious from being input and allowing prompts deemed to be safe to be input. In some cases, the consuming application or process flags the prompt as being malicious for quality assurance upon a determination that the prompt comprises malicious content. In some cases, it may be desirable to modify a prompt (which can be performed by the consuming application or process) so that it ultimately is non-malicious. For example, only portions of the prompt may be deemed malicious and such aspects can be deleted or modified prior to ingestion by the GenAI model. Such an arrangement still provides the attacker with an output/response thereby potentially masking the fact that the system identified the response as being malicious.

In some cases, the similarity analysis is performed using the received data (e.g., the prompt or information characterizing the prompt) while, in other cases, the received data can be preprocessed in some fashion. For example, the received data can be tokenized and the resulting tokens are what are used by the similarity analysis. In other variations, the received data can be vectorized (i.e., features can be extracted from the prompts and such features can populate a vector, etc.). The resulting vector(s) can be used to generate embeddings using one or more dimension reduction techniques. Embeddings are advantageous in that they have lower dimensionality so that the similarity analysis consumes fewer computing resources (as compared to the original prompt or the original vector).

The similarity analysis can take varying forms. In addition, more than one technique for similarity analysis can be utilized in parallel or in sequence. In some arrangement, a first similarity analysis is performed and, if there is a match, a second, more computationally expensive similarity analysis is performed. Match in this context means that some or all of the prompt is within a defined threshold relative to the blocklist (e.g., 95% matching, etc.).

The similarity analysis can be an N-grams similarity analysis. For example, by leveraging raw text or REGEX expressions of the N-grams (primarily in cases of PII), one can derive whether or not a prompt is harmful by performing a comparison between what is input or output with what is on the blocklist. Matches would have to be of a certain similarity threshold in order to be deemed malicious or otherwise problematic. Further, in some variations, the blocklist itself can be generated by deriving a plurality of N-grams from the corpus of known malicious prompts.

The similarity analysis can comprise a semantic analysis in which distance measurements indicative of similarity are generated based on a likeness of meaning of the received data to the blocklist. Semantic analyses can include one or more of: TF-IDF (Term Frequency-Inverse Document Frequency Distance) and Cosine Similarity. These techniques can measure the distance between two vector representations of the text (embeddings distance).

The blocklist can be ordered according to frequency. In such cases, the similarity analysis process can terminate upon a similarity match above a pre-determined threshold thereby utilizing fewer computational resources.

Figure 12:
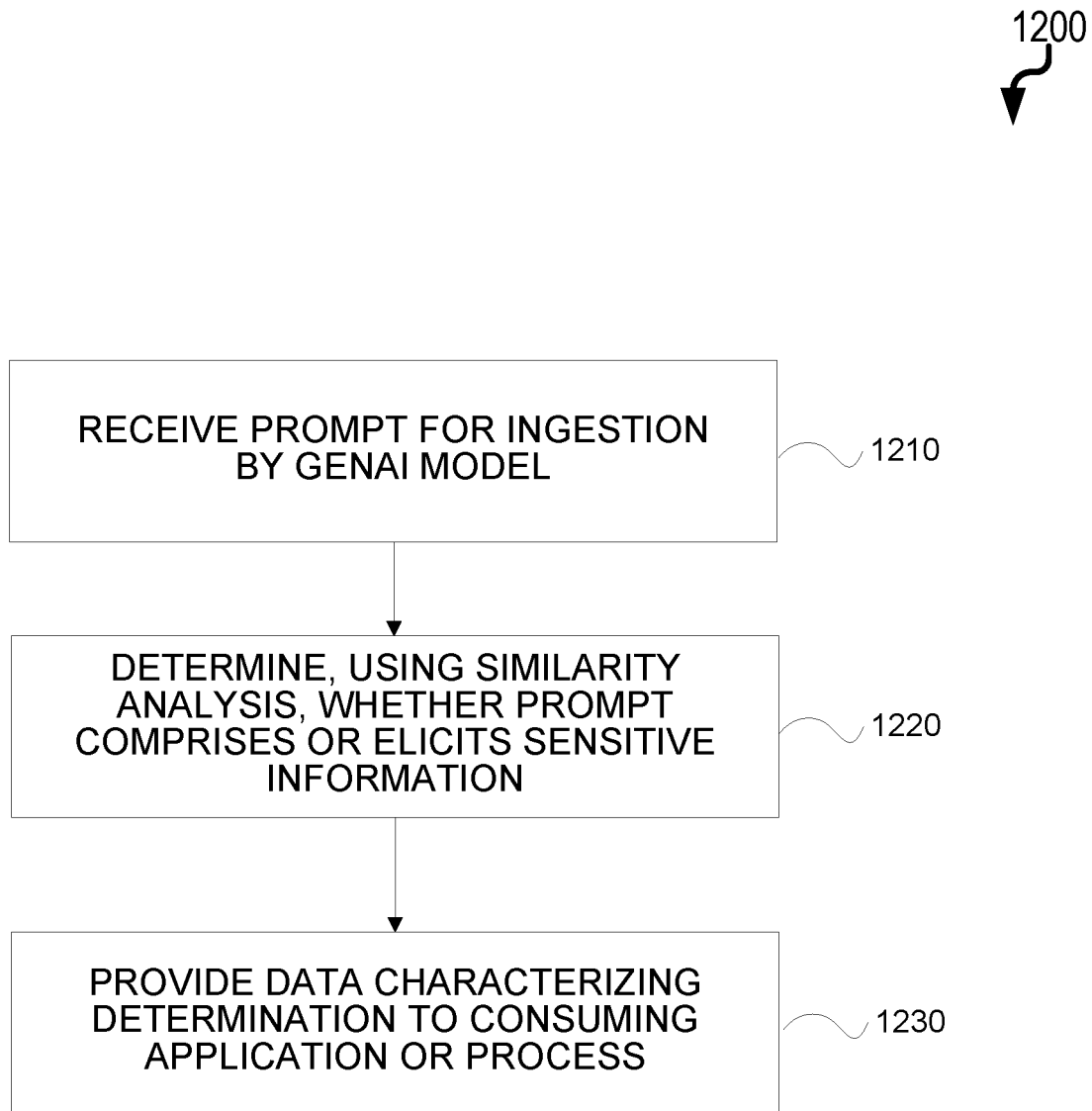
FIG. 12 is a process flow diagram illustrating monitoring of prompts of a machine learning architecture for sensitive content.

FIG. 12 is a diagram 1200 in which, at 1210, data characterizing a prompt for ingestion by a GenAI model is received (for example, by analysis engine 152 and/or analysis engine 170). A determination is made, at 1220, whether the prompt comprises or otherwise elicits sensitive information based on a similarity analysis between a blocklist and the received data. This determination can be made, for example, by analysis engine 152 and/or analysis engine 170. The blocklist being derived from a corpus of prompts having sensitive information. For example, as noted above, sensitive information such as a Social Security Number can potentially be obtained by leveraging REGEX patterns for identification. Data characterizing the determination can be provided, at 1230, to a consuming application or process.

The process in FIG. 12 can be complementary to that of the process in FIG. 11 or it can be utilized standalone. The similarity analysis can be similar to those described above as well as the remedial actions. In some cases, the consuming application or process modifies the prompt to remove, redact, or transform the sensitive information upon a determination that the prompt comprises sensitive information and causes the modified prompt to be ingested by the GenAI model. This modification can, in turn, lessen the likelihood of the GenAI model leaking, bypassing security measures, generating or consuming malicious content, or otherwise conveying sensitive information and the like.

Figure 13:
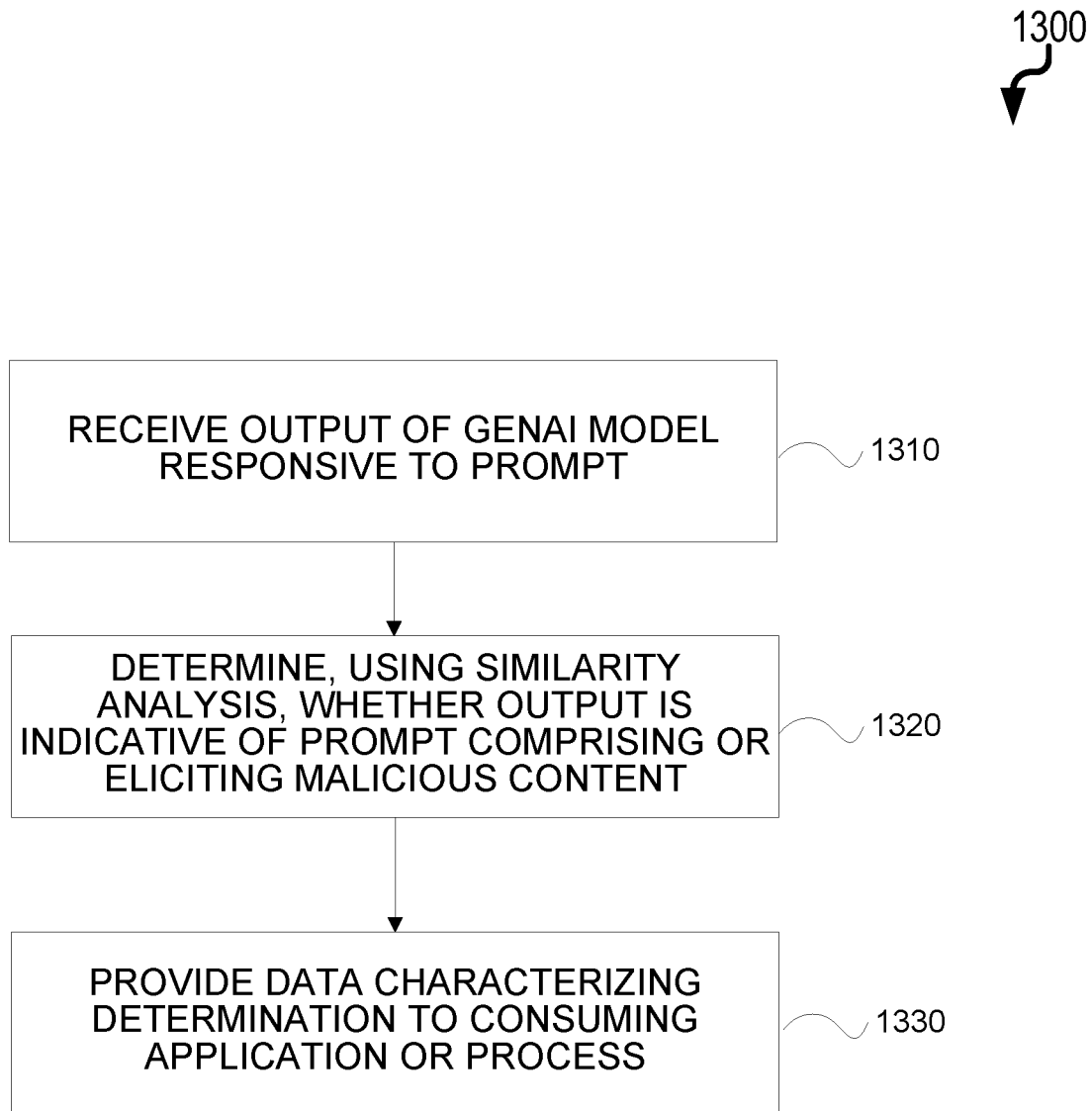
FIG. 13 is a process flow diagram illustrating monitoring of outputs of a machine learning architecture indicative of malicious content in the corresponding prompt.

FIG. 13 is a diagram 1300 in which, at 1310, an output of a GenAI model is received. The output can be received, for example, by one or more of analysis engine 152 or analysis engine 170. A determination is made, at 1320, whether the output indicates that the corresponding prompt was malicious (included malicious content or elicited malicious content, etc.) based on a similarity analysis between a blocklist and the received data. The determination can be made by one or more of analysis engine 152 or analysis engine 170. The blocklist can be derived from a corpus of machine learning model outputs responsive to malicious prompts. The malicious prompts are known to result in undesired behavior by the GenAI model such as information leakage, bypassing of security measures, generation or consumption of malicious content, etc. Thereafter, at 1330, data characterizing the determination is provided to a consuming application or process.

The process in FIG. 13 can be complementary to that of the processes in FIG. 11 or FIG. 12 or it can be utilized standalone. The similarity analysis can be similar to those described above as well as the remedial actions. In some cases, the consuming application or process modifies the output to remove, redact, or transform the some portion of the content upon a determination that the output is indicative of the corresponding prompt to be malicious. This modification can, in turn, lessen the likelihood of success of a malicious attack on the GenAI model.

Figure 14:
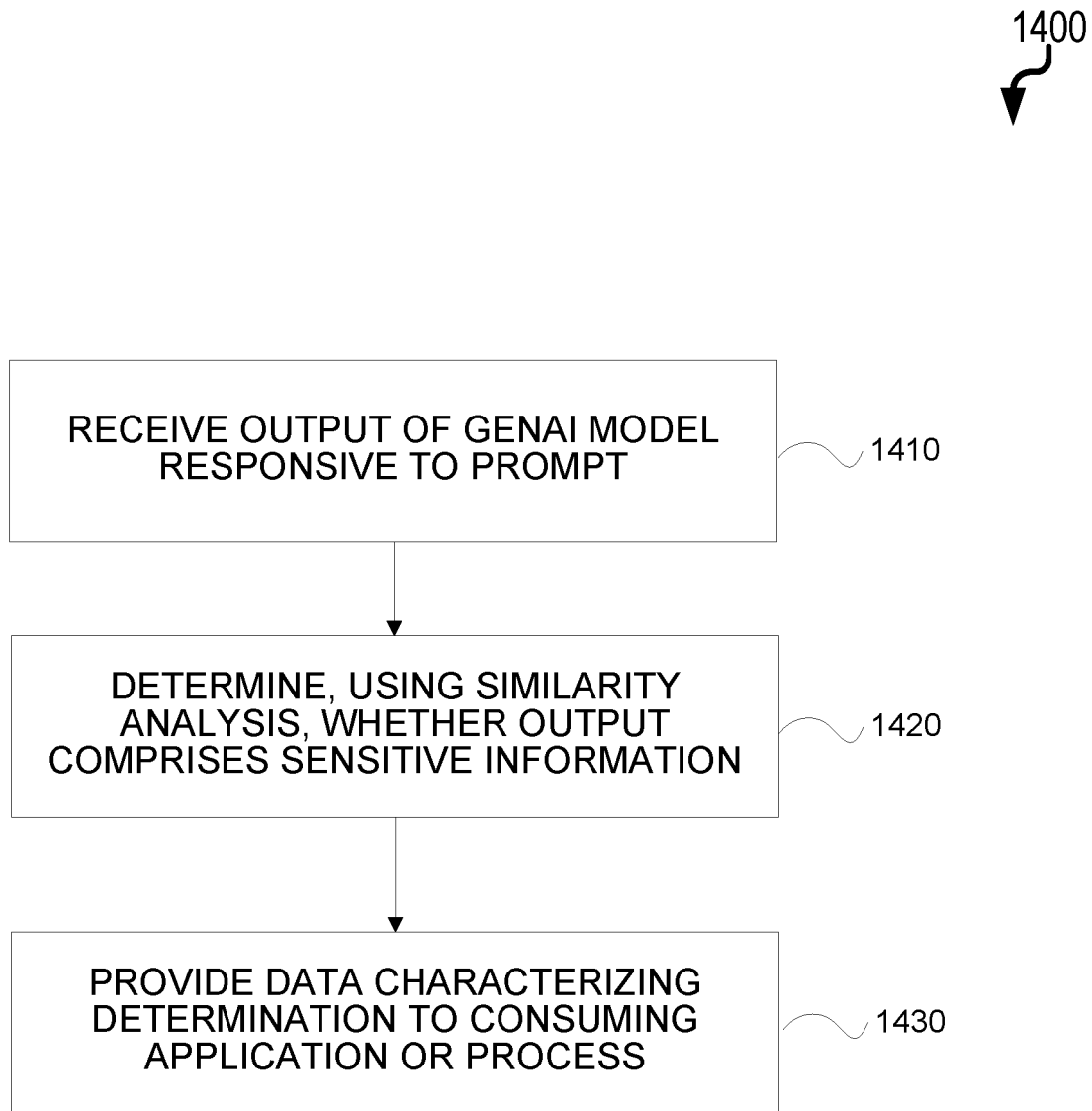
FIG. 14 is a process flow diagram illustrating monitoring of outputs of a machine learning architecture for inclusion of sensitive information.

FIG. 14 is a diagram 1400 in which, at 1410, an output of a GenAI model which is responsive to a prompt is received. One or more of analysis engine 152 and analysis engine 170 can receive an analyze the output. It is then determined, at 1420, whether the output indicates comprises sensitive information based on a similarity analysis between a blocklist and the received data. The blocklist can be derived from a corpus of machine learning model outputs responsive to prompts resulting in undesired behavior by the GenAI model. Data providing the determination is later provided, at 1430, to a consuming application or process.

The process in FIG. 14 can be complementary to that of the processes in FIGS. 11-13 or it can be utilized standalone. The similarity analysis can be similar to those described above as well as the remedial actions. In some cases, the consuming application or process modifies the output to remove, redact, or transform the some portion of the sensitive information upon a determination that the output contains sensitive information.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor (e.g., CPU, GPU, etc.), which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computing device having a display device (e.g., a LED or LCD (liquid crystal display) monitor) for displaying information to the user and a keyboard and an input device (e.g., mouse, trackball, touchpad, touchscreen, etc.) by which the user may provide input to the computing device. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
receiving, by an analysis engine, data characterizing an output of a generative artificial intelligence (GenAI) model responsive to a prompt from a requesting client device;
determining, by the analysis engine using the received data, whether the output indicates that the prompt contained or elicited malicious content or undesired behavior by the GenAI model based on a similarity analysis between a blocklist and the received data, the blocklist being derived from a corpus of machine learning model outputs responsive to malicious prompts; and
providing data characterizing the determination to a consuming application or process which prevents the output from being transmitted to the requesting client device upon a determination that the output indicates that the prompt comprises malicious content.

2. The method of claim 1 further comprising:
tokenizing the data characterizing the output to result in a plurality of tokens; and
wherein the similarity analysis compares the blocklist to the plurality of tokens.

3. The method of claim 1 further comprising:
vectorizing the data characterizing the output to result in one or more vectors;
generating one or more embeddings based on the one or more vectors, the embeddings having a lower dimensionality than the one or more vectors; and
wherein the similarity analysis compares the blocklist to the generated one or more embeddings.

4. The method of claim 1, wherein the similarity analysis comprises an N-grams similarity analysis.

5. The method of claim 4 further comprising:
generating the blocklist by deriving a plurality of N-grams from the corpus of machine learning model outputs responsive to malicious prompts.

6. The method of claim 1, wherein the similarity analysis comprises a semantic analysis in which distance measurements indicative of similarity are generated based on a likeness of meaning of the received data to the blocklist.

7. The method of claim 1, wherein the blocklist is ordered according to frequency and the similarity analysis terminates upon a similarity match above a pre-determined threshold.

8. The method of claim 1, wherein the GenAI model comprises a large language model.

9. The method of claim 1, wherein the consuming application or process allows the output to be transmitted to the requesting client device upon a determination that the output indicates that the prompt does not comprise malicious content.

10. The method of claim 1, wherein the consuming application or process flags the output as containing sensitive information for quality assurance upon a determination that the output indicates that the prompt comprises malicious content.

11. A computer-implemented method comprising:
receiving, by an analysis engine, data characterizing an output of a generative artificial intelligence (GenAI) model responsive to a prompt or query from a requesting client device;
determining, by the analysis engine using the received data, whether the output comprises sensitive information based on a similarity analysis between a blocklist and the received data, the blocklist being derived from a corpus of machine learning model outputs responsive to prompts resulting in undesired behavior by the GenAI model; and
providing data characterizing the determination to a consuming application or process which prevents the output from being transmitted to a requesting client device upon a determination that the prompt comprises sensitive information.

12. The method of claim 11 further comprising:
tokenizing the data characterizing the output to result in a plurality of tokens; and
wherein the similarity analysis compares the blocklist to the plurality of tokens.

13. The method of claim 11 further comprising:
vectorizing the data characterizing the output to result in one or more vectors;
generating one or more embeddings based on the one or more vectors, the embeddings having a lower dimensionality than the one or more vectors; and
wherein the similarity analysis compares the blocklist to the generated one or more embeddings.

14. The method of claim 11, wherein the similarity analysis comprises an N-grams similarity analysis.

15. The method of claim 14 further comprising:
generating the blocklist by deriving a plurality of N-grams from the corpus of machine learning model outputs responsive to prompts resulting in undesired behavior by the GenAI model.

16. The method of claim 11, wherein the similarity analysis comprises a semantic analysis in which distance measurements indicative of similarity are generated based on a likeness of meaning of the received data to the blocklist.

17. The method of claim 11, wherein the blocklist is ordered according to frequency and the similarity analysis terminates upon a similarity match above a pre-determined threshold.

18. The method of claim 11, wherein the GenAI model comprises a large language model.

19. The method of claim 11, wherein the consuming application or process allows the output to be transmitted to the requesting client device upon a determination that the prompt does not comprise sensitive information.

20. The method of claim 11, wherein the consuming application or process flags the output as containing sensitive information for quality assurance upon a determination that the output comprises sensitive information.

21. A system comprising:
at least one data processor; and
non-transitory memory storing instructions which, when executed by the at least one data processor, result in operations comprising:
receiving data characterizing an output of a generative artificial intelligence (GenAI) model responsive to a prompt from a requesting client device;
determining, using the received data, whether the output indicates that the prompt contained or elicited malicious content or undesired behavior by the GenAI model based on a similarity analysis between a blocklist and the received data, the blocklist being derived from a corpus of machine learning model outputs responsive to malicious prompts; and
providing data characterizing the determination to a consuming application or process which prevents the output from being transmitted to the requesting client device upon a determination that the output indicates that the prompt comprises malicious content.

22. The system of claim 21, wherein the similarity analysis comprises an N-grams similarity analysis.

23. The system of claim 22, wherein the operations further comprise:
generating the blocklist by deriving a plurality of N-grams from the corpus of machine learning model outputs responsive to malicious prompts.

24. The system of claim 22, wherein the similarity analysis comprises a semantic analysis in which distance measurements indicative of similarity are generated based on a likeness of meaning of the received data to the blocklist.

* * * * *